(12) United States Patent
Kim et al.

(10) Patent No.: US 7,302,464 B2
(45) Date of Patent: Nov. 27, 2007

(54) USER REQUEST PROCESSING METHOD AND APPARATUS USING UPSTREAM CHANNEL IN INTERACTIVE MULTIMEDIA CONTENTS SERVICE

(75) Inventors: Sung-jin Kim, Kyungki-do (KR); Do-kyoon Kim, Kyungki-do (KR)

(73) Assignee: Samsung Electronics Co., Ltd., Suwon, Kyungki-Do (KR)

( * ) Notice: Subject to any disclaimer, the term of this patent is extended or adjusted under 35 U.S.C. 154(b) by 863 days.

(21) Appl. No.: 09/802,847

(22) Filed: Mar. 12, 2001

(65) Prior Publication Data

US 2001/0025297 A1    Sep. 27, 2001

(30) Foreign Application Priority Data

Mar. 14, 2000 (KR) ............................. 2000-12848

(51) Int. Cl.
*G06F 15/16* (2006.01)
*H04N 7/16* (2006.01)

(52) U.S. Cl. .................. 709/203; 709/217; 709/231; 725/135

(58) Field of Classification Search ........ 709/201–203, 709/217–223, 227–231; 715/500.1; 725/86.12, 725/135
See application file for complete search history.

(56) References Cited

U.S. PATENT DOCUMENTS 5,680,322 A     10/1997  Shinoda
5,805,804 A *   9/1998   Laursen et al. ............. 709/223
6,044,397 A *   3/2000   Eleftheriadis et al. ...... 725/139
6,130,898 A *   10/2000  Kostreski et al. ........... 370/522
6,317,131 B2 *  11/2001  Basso et al. ................. 345/474
6,611,262 B1 *  8/2003   Suzuki ....................... 345/419

(Continued)

FOREIGN PATENT DOCUMENTS

JP         2002-331810       11/2002

(Continued)

OTHER PUBLICATIONS

The Virtual Reality Modeling Language Specification Version 2.0, Aug. 4, 1996, Bell et al.*

(Continued)

*Primary Examiner*—Glenton B. Burgess
*Assistant Examiner*—Yasin M Barqadle
(74) *Attorney, Agent, or Firm*—Buchanan Ingersoll & Rooney PC

(57) ABSTRACT

A user request processing method and apparatus, using an upstream channel, is provided, in which if a user request of predetermined processing for some predetermined nodes in interactive multimedia contents services, preferably, in an MPEG-4 binary format for a scene (BIFS) scene occurs, the user terminal forms an upstream channel message for the BIFS scene and transmits the message to the server through upstream channels, and the server processes and encodes the corresponding BIFS scene nodes and then transmits the nodes to the terminal. According to the methods and apparatuses, by properly handing events of user requests on partial elements in an arbitrary multimedia content provided for the user as interactive multimedia contents services, predetermined elements can be selectively processed. Therefore, information volume to be transmitted for restoration from an error can be minimized, and the terminal can quickly receive restored information.

20 Claims, 7 Drawing Sheets

U.S. PATENT DOCUMENTS

| | | | |
|---|---|---|---|
| 6,631,403 B1 * | 10/2003 | Deutsch et al. | 709/217 |
| 6,654,761 B2 * | 11/2003 | Tenev et al. | 707/102 |
| 6,654,931 B1 * | 11/2003 | Haskell et al. | 715/500.1 |
| 6,697,869 B1 * | 2/2004 | Mallart et al. | 709/231 |
| 2002/0026642 A1 * | 2/2002 | Augenbraun et al. | 725/109 |

FOREIGN PATENT DOCUMENTS

| | | |
|---|---|---|
| WO | 98/46006 | 10/1998 |
| WO | 99/03280 | 1/1999 |
| WO | 99/39272 | 8/1999 |
| WO | 00/01154 | 1/2000 |
| WO | 00/10663 | 3/2000 |

OTHER PUBLICATIONS

Suzuki, T et al., "The 21st Century Interactive Imaging Technology MPEG4", 1998, pp. 198-205.

* cited by examiner

FIG. 7a

| Upstream_Channel_Message() { | No. of bits | Mnemonic |
|---|---|---|
| NodeID | 192 | simsbf |
| command | 2 | uimsbf |
| byte_align_for_back_channel() | | |
| ~ | | |

FIG. 7b

| byte_align_for_back_channel() { | No. of bits | Mnemonic |
|---|---|---|
| while(!byte_aligned()) | | |
| one_bit | 1 | '1' |
| ~ | | |

USER REQUEST PROCESSING METHOD AND APPARATUS USING UPSTREAM CHANNEL IN INTERACTIVE MULTIMEDIA CONTENTS SERVICE

Priority is claimed to Korean Patent Application No. 00-12848 filed on Mar. 14, 2000, herein incorporated by reference.

BACKGROUND OF THE INVENTION

1. Field of the Invention

The present invention relates to a system providing bidirectional communication services, and more particularly, to a user request processing method and apparatus using an upstream channel in interactive multimedia contents services.

2. Description of the Related Art

In order to provide various functions for interactive multimedia contents services, in the field for providing bidirectional communication services, for example, in the field of moving picture expert group (MPEG)-4 system (ISO/IEC JTC 1/SC 29/WG11 14496-1), various technologies for enabling those services are being standardized. To satisfy various requirements from users who receive multimedia contents services, those systems are providing functions for each multimedia contents provider processing various events occurring at user's sites, through an upstream channel of each multimedia contents provider.

Between a server (including an encoder) for encoding and managing data on arbitrary object information, and a user terminal (including a decoder) for receiving and restoring the data, two types of channels for transmitting data exist including a downstream channel for transmitting data from the server to the user terminal and an upstream channel for transmitting data from the user terminal to the server. When user's various requests should be processed frequently as in video-on-demand (VOD) or World Wide Web (WWW) environment, an upstream channel are used. That is, the upstream channel is used in a system for providing bidirectional communication services, in which necessary information is immediately provided from a server for services that cannot be processed in a user terminal.

For data, in which errors occurred, on an application which provides only one-way telecommunications services, the processing method from the system side is different from that from the user side. On the system side, the size of a transmission data packet on a channel is checked, or whether or not data error occurred is checked according to the data format types such as a parity bit, in a lower layer of a network, such as a TCP/IP layer. If an error occurred, the server receives the data again for processing the error. However, in this method, it is a problem that logical errors occurred in transmission data or retransmission service in order of importance of data to be restored cannot be provided from the system side. Therefore, to consider this problem, a system for providing bidirectional communication service is needed, in which the user terminal checks errors in the restoration process, and if an error exists, transmits related information for restoring original data to the server through an upstream channel, and then the server restores error-containing data, retransmits the data to the user terminal so that the original data can be restored and errors can be processed.

Meanwhile, an MPEG-4 system providing bidirectional communication services enables the use of an upstream channel provided by each multimedia content provider in processing various events occurring in a user terminal. However, more specifically, for example, in various interactive multimedia contents services such as providing three-dimensional scenes for users, and receiving a request of processing some nodes in a scene from a user, the MPEG-4 system does not propose how to process the user request using the upstream channel.

SUMMARY OF THE INVENTION

To solve the above problems, it is an object of the present invention to provide a user request processing method and apparatus using an upstream channel, in which events of user requests on partial elements in arbitrary multimedia contents provided for the user as interactive multimedia contents services can be properly handled.

It is another object to provide a user request processing method and apparatus using an upstream channel, in which events of user requests on some nodes in a scene provided for the user in MPEG-4 binary format for scene (BIFS) format can be properly handled.

To accomplish the above object of the present invention, there is provided a user request processing method, using an upstream channel, after a three-dimensional scene generated based on a binary format, is transmitted from a server to a terminal, the user request processing method having the steps of (a) setting downstream/upstream channels between the server and the terminal as initialization; (b) the terminal forming an upstream channel message if a user request of predetermined processing of a predetermined object occurs in a scene transmitted from the server to the terminal through the downstream channel, and transmitting the message to the server through the upstream channel; (c) the server receiving the upstream channel message, interpreting the message, processing the message as the user request of predetermined processing, and transmitting the result to the terminal; and (d) the terminal substituting the processing result of step (c) for the predetermined object in the scene transmitted in step (b), and providing it to the user.

To accomplish another object of the present invention, there is also provided a user request processing apparatus using an upstream channel in a system providing bidirectional communication services, the user request processing apparatus having a server for transmitting through a downstream channel a three-dimensional scene generated based on a binary format, receiving and interpreting an upstream channel message, and processing the message as user's request of predetermined processing; and a terminal for forming an upstream channel message if a user request of predetermined processing for a predetermined object in the scene transmitted from the server occurs, and transmitting the message to the server through an upstream channel.

BRIEF DESCRIPTION OF THE DRAWINGS

The above objects and advantages of the present invention will become more apparent by describing in detail preferred embodiments thereof with reference to the attached drawings in which:

FIGS. 7A and 7B illustrate the syntax of upstream channel information and the syntax of related information.

DETAILED DESCRIPTION OF THE INVENTION

Hereinafter, embodiments of the present invention will be described in detail with reference to the attached drawings. The present invention is not restricted to the following embodiments, and many variations are possible within the spirit and scope of the present invention. The embodiments of the present invention are provided in order to more completely explain the present invention to anyone skilled in the art.

The same reference numbers refer to the same respective elements throughout the drawings.

Figure 1:
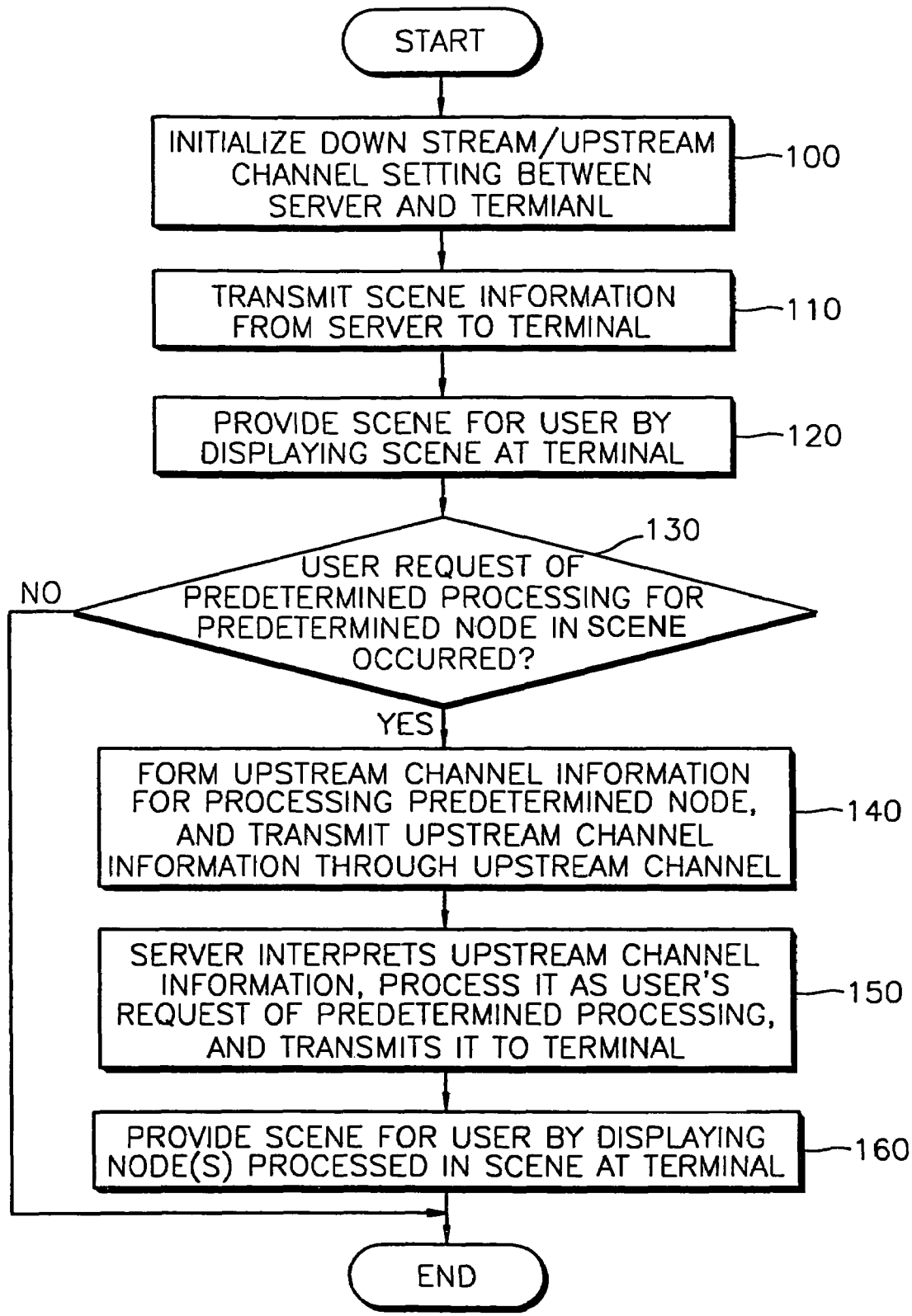
FIG. 1 is a flowchart for explaining a user request processing method according to the present invention.

FIG. 1 is a flowchart for explaining a user request processing method according to the present invention.

FIG. 1 explains a user request processing method using an upstream channel, as a preferable embodiment of the present invention, when a scene, which is generated based on MPEG-4 BIFS describing scene nodes for expressing three-dimensional scene on an MPEG-4 system, is transmitted from a server to a user terminal. In the present invention, a scene can be a still picture of one frame containing objects, or moving pictures or a series of pictures formed of a plurality of frames. Here, the MPEG-4 BIFS in the MPEG-4 system is just one example. The present invention is used in all bidirectional communication service systems for providing interactive multimedia contents services, and more characteristically, is used in various systems providing contents of scenes generated based on various binary formats for describing scene nodes.

Figure 3:
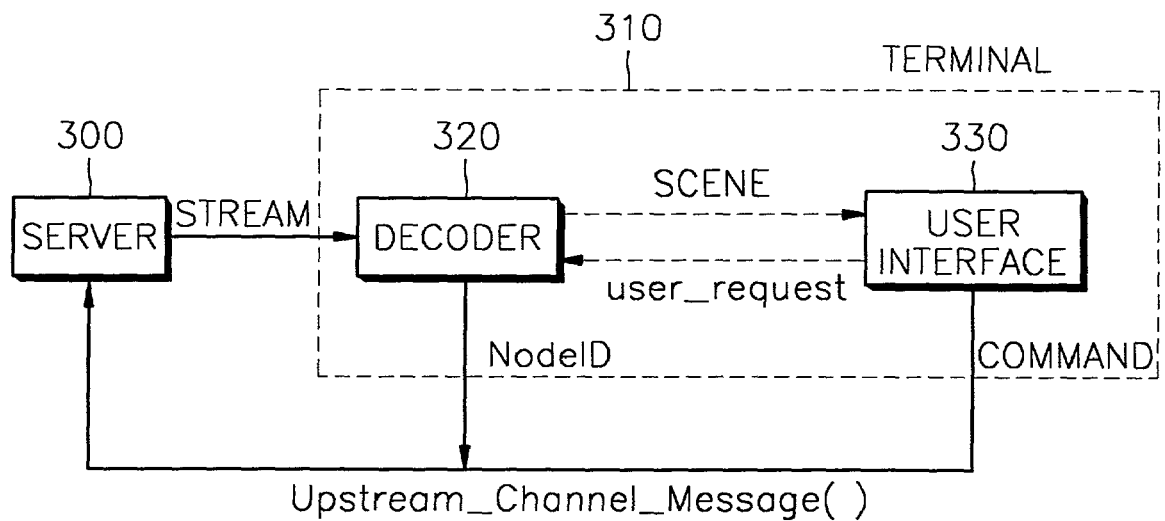
FIG. 3 is a block diagram for showing a user request processing apparatus according to the present invention.

FIG. 3 is a block diagram for showing an embodiment of a user request processing apparatus according to the present invention, and the apparatus has a server 300 and a terminal 310, both of which are connected to each other through a network, and the terminal 310 contains a decoder 320 and a user interface 330. Here, when the user request processing apparatus according to the present invention is implemented so as to provide an upstream service function for properly handling user requests on an MPEG-4 BIFS scene in an MPEG-4 system, the server 300 has an MPEG-4 scene encoder, and the decoder 320 has an MPEG-4 scene decoder. The user request processing apparatus according to the present invention forms upstream channel information (Upstream_Channel_Message( )) in the terminal 310 so as to guarantee the integrity of a BIFS scene in the MPEG-4 system, and transmits the information to the server 300 through an upstream channel. The server 300 processes scene nodes selected in the subject BIFS scene according to the processing type requested by the terminal 310.

The operation of the present invention will now be explained in detail referring to FIGS. 1 and 3.

First, if the server 300 and the terminal 310 are connected to each other through a network, as an initial step, downstream/upstream channels are set so that information can be transmitted between the server 300 and the terminal 310, in step 100. Particularly, the present invention uses a structure provided on an MPEG-4 system, as shown in FIG. 2, so that an upstream channel function for transmitting information from a terminal to a server is set to satisfy a user request.

Figure 2:
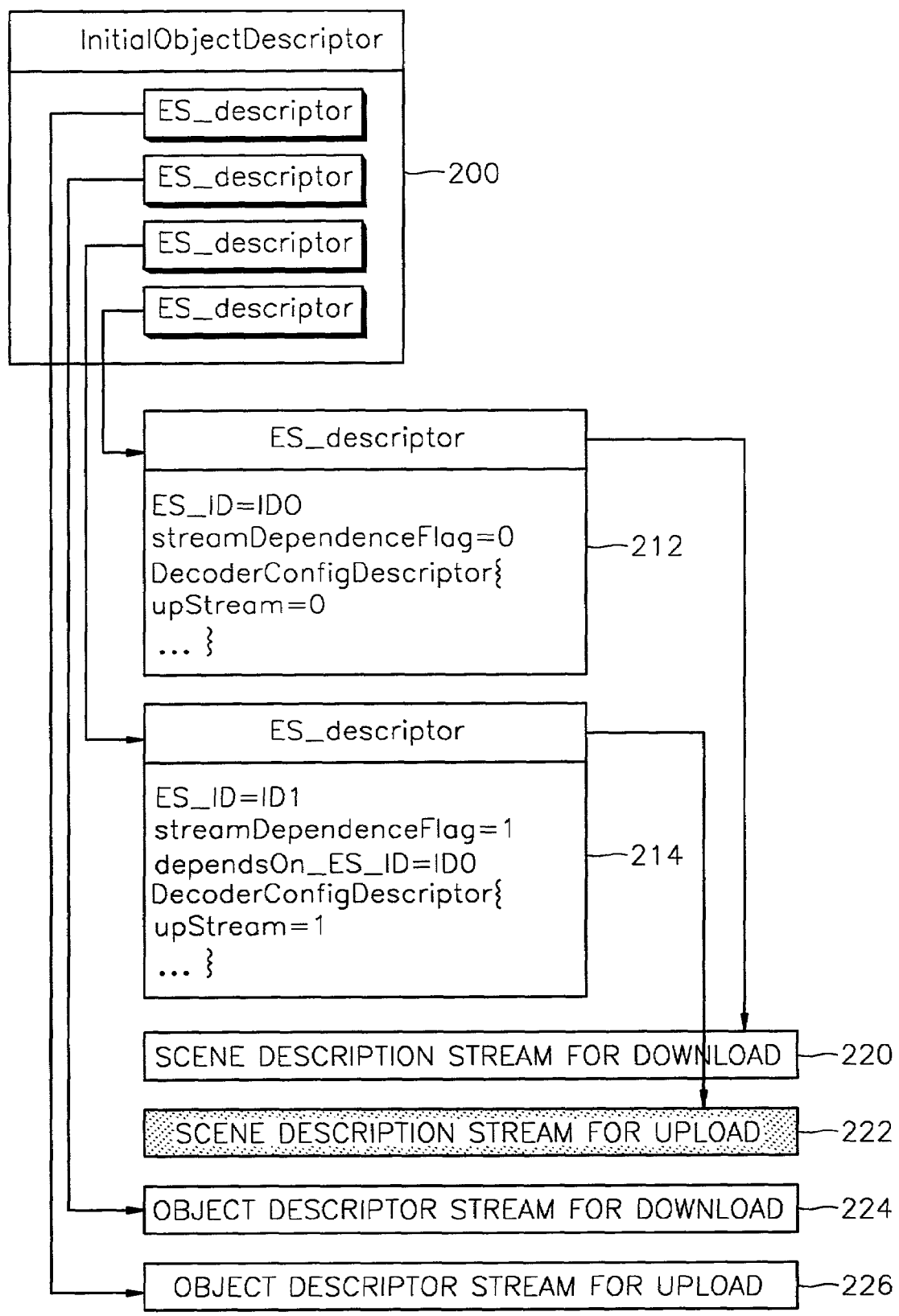
FIG. 2 illustrates the structure provided on an MPEG-4 system for setting an upstream channel function.

Referring to FIG. 2, an initial object descriptor 200 is formed of four types of elementary stream descriptors (ES_Descriptor). The four types of ES_Descriptors describes a scene description stream 220, which describes initial information to be transmitted from a server to a terminal, that is, descriptive information of objects forming a scene, the location of object information, relations between objects, and its upstream 222, and an object descriptor stream 224, which shows descriptors for data streams, which will actually receive information on each object, and the types of respective objects in a scene, and its upstream 226.

As shown in FIG. 2, based on the initial object descriptor 200, four stream channels 220 through 226 are set in the terminal. Each ES_Descriptor 212 and 214 is connected to appropriate streams, using an elementary stream identifier (ES_ID) which can distinguish each stream. Therefore, using ES_IDs contained in the initial object descriptor transmitted from the server, the terminal identifies a scene description stream and an object descriptor stream, which are transmitted through the network channel.

More specifically, a scene description stream contains node identifiers for each object forming a scene, temporal/spatial information on each object, and information on correlation of respective objects. Also, the scene description stream contains object descriptor ID (OD_ID), which is a pointer to the actual location of descriptive information on each object. Using this OD_ID, the terminal identifies information on each object in an object descriptor stream, and connects the object structure in an MPEG-4 BIFS scene. The upstream for the scene description stream means one upstream channel for all objects forming an MPEG-4 BIFS scene. In the structure of the ES-descriptor 214, describing the upstream in the initial object descriptor, upStream flag is initialized at "1" and streamDependenceflag is initialized at "1" so as to indicate that ES_descriptor 214 is dependent on ES_descriptor 212. The terminal checks that upstream flag is "1" and then specifies that one channel is an upstream channel for transmitting information to the server. Then, using streamDependenceflag, it is specified that the upstream 222 is about a scene description stream providing information which can be currently used. The upstream 222 can appropriately form information to be transmitted to the server, using all information related to the entire scene described by the referred scene description stream. Each object descriptor in an object descriptor stream is formed of a plurality of ES_Descriptors, including ES_IDs which can distinguish streams actually having descriptive information on each unit object, upstream information on whether or not each object has an upstream channel from the terminal to the server, and encoding information on objects being transmitted from the terminal to the server. The terminal identifies elementary streams containing actual object information, using ES_ID information in ES_Descriptor, and determines the presence of an upstream channel for each object, using upstream information.

Therefore, the MPEG-4 system supports the user side so that the user can transmit various information to the server using the upstream channel 222 shown in FIG. 2. Using this structure, the present invention, which will be explained, discloses methods for generating and forming upstream channel information needed in processing various user requests transmitted from the terminal to the server, a method for server interpreting information received from the terminal, responding to the upstream channel information, and a method for appropriately generating response information to be transmitted to the terminal using the interpreting method.

Referring to FIG. 1 again, after step 100, information on a BIFS scene is transmitted from the server 300 to the terminal 310 in step 110. This step is performed by information transmitting and processing method commonly known between the server and the terminal. Next, the scene is provided to the user by displaying the scene at the terminal 310 in step 120.

Next, whether or not a user request of processing a predetermined node of a predetermined object in the scene occurred is determined in step 130. If so, upstream channel information for predetermined processing is formed and transmitted to the server 300 through the upstream channel in step 140.

In FIG. 3, the decoder 320 interprets the scene description stream transmitted from the server 300 so that the result can be displayed through the user interface 330 including an indicator. The user interface 330 passes the user request on displayed information to the decoder 320. Since the decoder 320 has information on the currently transmitted scene, the decoder 320 can figure out which node in the scene corresponds to the user request. Together with a command corresponding to the user request, the corresponding node identifier (Node ID) of the node interpreted in the decoder 320 forms upstream channel information (Upstream_Channel_Message ( )).

Next, the server 300 receives and interprets upstream channel information, processes it as user's request of predetermined processing, and transmits the result to the terminal 310 in step 150. Finally, the terminal 310 provides newly substituted node(s) for the user, by displaying node(s), which were processed in step 150 according to the user's request, in step 160.

Figure 4:
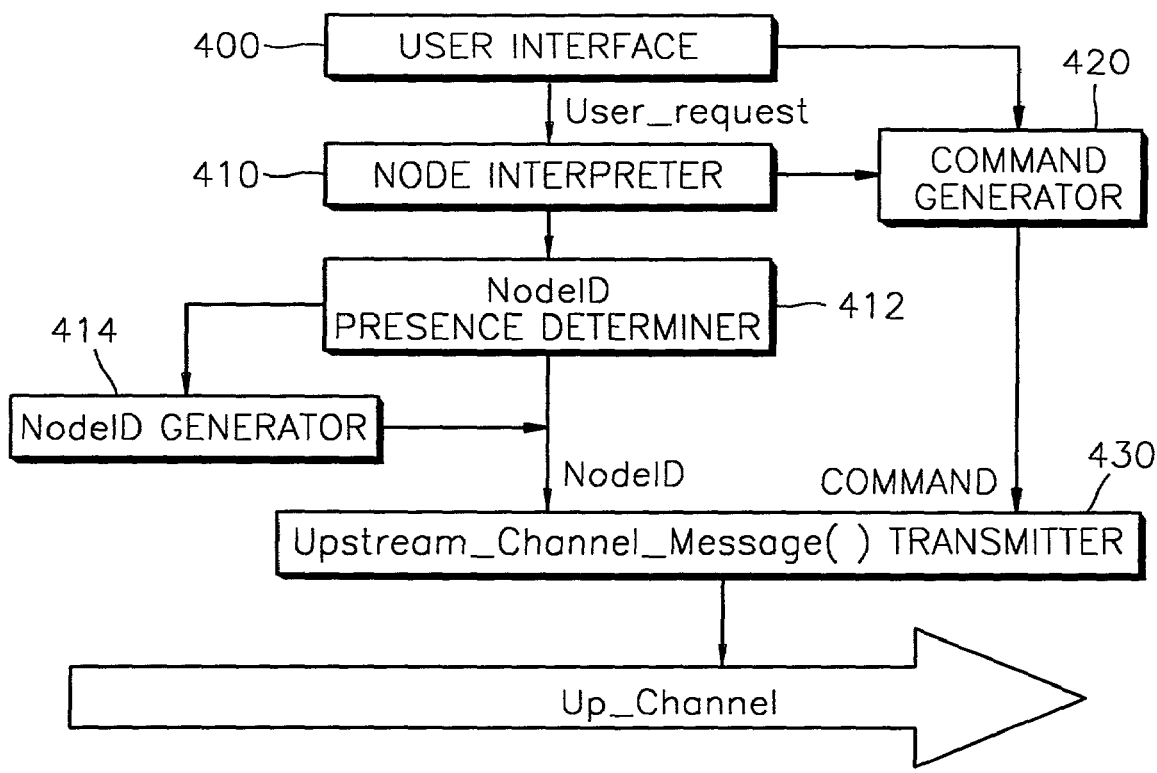
FIG. 4 is a block diagram for a preferable embodiment of a terminal forming upstream channel information according to the present invention.

FIG. 4 is a block diagram for a preferable embodiment of the terminal 310, which forms upstream channel information in step 140, according to the present invention.

Referring to FIG. 4, step 140 described above will now be explained in detail.

If a user watches the display screen and selects a predetermined object, a user request (user_request) for a predetermined object in the entire BIFS scene is generated and transmitted through a user interface 400. A node interpreter 410 defines a corresponding node in the current scene in which the user request is generated, using a node identifier (NodeID) according to the location of a node used in the scene or sequence information, etc.

By the presence of a NodeID, a NodeID presence determiner 412 determines whether or not the defined node is a reusable node in the scene. The Node ID presence determiner 412 is informed in advance of a NodeID for each object in the scene, as information on the entire BIFS scene containing the predetermined node. Basically, in the scene transmitted from the server 300 to the terminal 310, a proper identifier, such as a NodeID, is assigned to and used in a node for each object, so as to provide reusability, that is, a function capable of responding to a user request. At this time, whether or not a NodeID is assigned is determined by the use of a DEFinition (DEF) command. The DEF command is defined in a scene description. For example, if a node is not defined by a DEF command, that is, it is not allowed to reuse the node in the scene, a NodeID for the node is not assigned in the scene.

If a NodeID assigned for reuse is not in a node defined by the node interpreter 410, a NodeID generator 414 finds out a node, for which a NodeID is defined, among the nodes immediately above the node defined in the BIFS scene, and process the NodeID of the above node so as to be used as the NodeID of the node selected by the user. Also, if reuse is not allowed for all nodes used in the scene, for example, a NodeID is defined as a value less than "0" so that all nodes, including the highest node, contained in the scene can be processed in the server.

Meanwhile, a command generator 420 defines a command to be processed in the server, for a node defined in the node interpreter 410, appropriately to the user request. With commands such as retransmission, deletion, or insertion of the requested node, predetermined commands for processing the node are defined, considering the characteristic of the node. An upstream channel message transmitter 430 forms an upstream channel message by combining the NodeID defined as described above in the node interpreter 300 and the commands defined in the command generator 315, and transmits the upstream channel message to the server through the upstream channel.

FIGS. 7A and 7B illustrate the syntax of upstream channel information and the syntax of related information.

Figure 5:
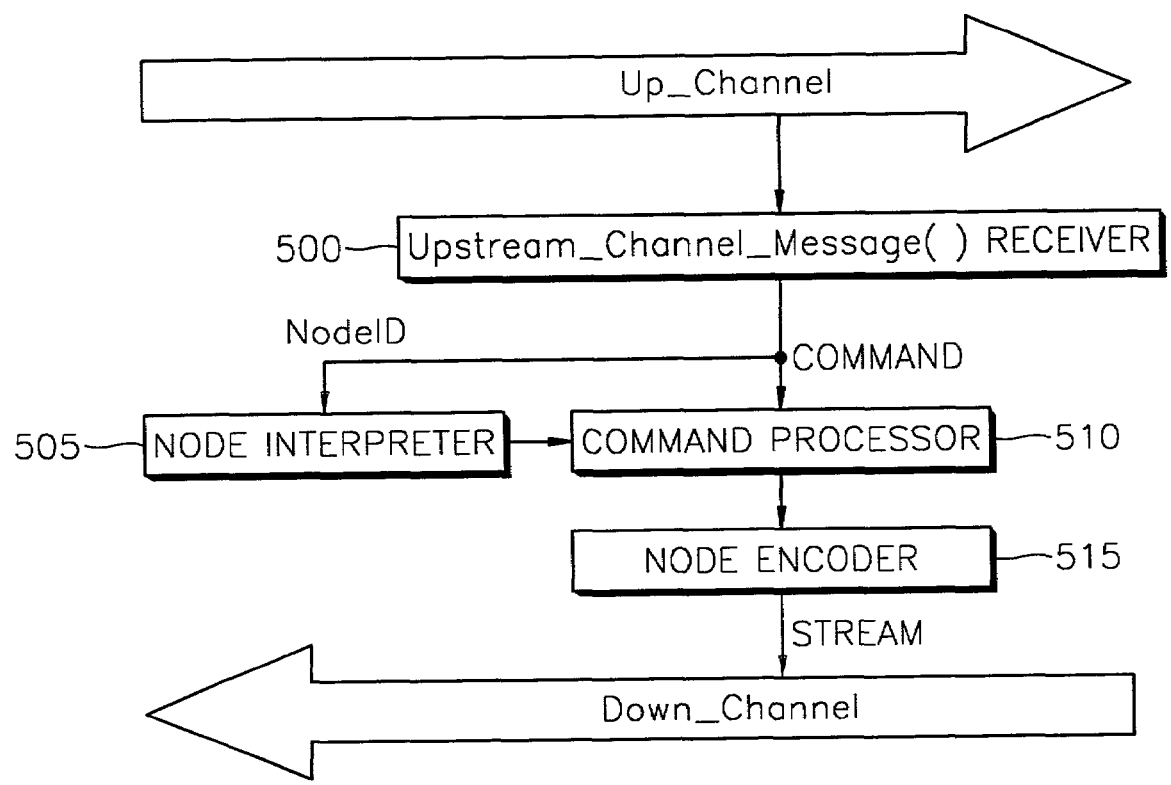
FIG. 5 is a block diagram for a preferable embodiment of a server processing upstream channel information according to the present invention.

FIG. 5 is a block diagram for a preferable embodiment of the server 300, which processes the upstream channel message in step 150, according to the present invention. To process the upstream channel message, the server 300 has an upstream channel message receiver 500, a node interpreter 505, a command processor 510, and a node encoder 515.

Referring to FIG. 5, step 150 described above will now be explained in detail.

First, the upstream channel message receiver 500 receives an upstream channel message (Upstream Channel Message( )) through the upstream channel. The node interpreter 505 confirms a NodeID in the upstream channel message. Then, the node interpreter 505 confirms whether or not the confirmed NodeID is for a node contained in the BIFS scene, the structure of the subject node indicated by the NodeID, and information on nodes directly dependent on this node.

Subject nodes to be processed are defined by a NodeID. When necessary, the node indicated by the NodeID and nodes dependent thereon are defined as subject nodes. At this time, if the confirmed NodeID does not exist in the BIFS scene to be processed, the node interpreter 505 stops execution. If the confirmed NodeID is for all nodes in the BIFS scene, then all nodes in the scene are defined as subject nodes.

If subject nodes are defined as described above, the command processor 510 confirms node commands to be executed in the server, in the upstream channel message receiver 500, and executes node operations for processing subject nodes, according to the node commands. The subject nodes processed in the server according to node commands are formed into a BIFS message in the node encoder 515, and transmitted to the terminal through the downstream channel.

So far, the structure and operation of the present invention have been explained. The present invention, for example, if a user request for retransmission of each predetermined object is transmitted to the server through the upstream channel, processes in the server only predetermined subject nodes to be transmitted so that the nodes can be transmitted to the terminal. By doing so, restoration in the terminal of predetermined objects, in which errors occurred, can be quickly performed and information volume transmitted for the restoration can be minimized.

FIGS. 6A through 6D illustrates an example of a process for processing a user request of a scene description stream, using an upstream channel.

Figure 6A:
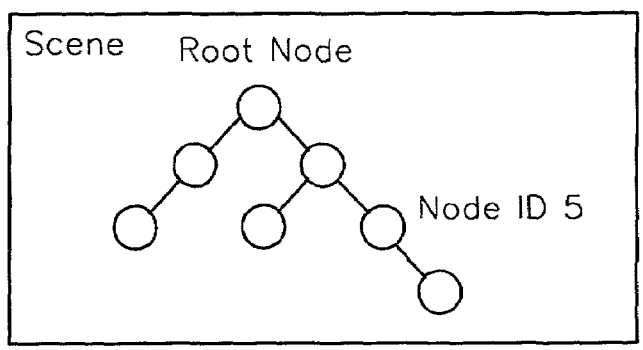
FIGS. 6A through 6D illustrate an example of a process for processing a user request of a scene description stream, using an upstream channel.
Figure 6A:
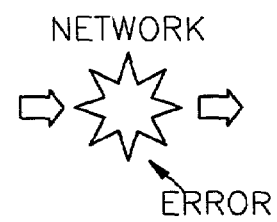

FIG. 6A illustrates an example of transmitting, to the terminal, the NodeID of each node forming a scene, temporal/spatial information on each object, and information on correlation among each object, using a scene description stream in a server having an MPEG-4 BIFS scene encoder. The server can transmit the information described above, all or partially. The decoder of the terminal interprets the information so that the user can watch the information on a display screen.

Figure 6B:
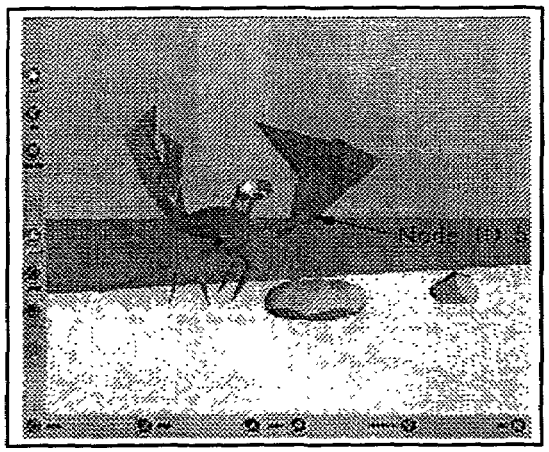
Figure 6B:

FIG. 6B illustrates an example of displaying nodes in an MPEG-4 BIFS scene containing an error, in a terminal having an MPEG-4 BIFS scene decoder, when transmission errors occur in transmitting nodes forming a scene through the downstream channel. The error occurred at the node whose NodeID is "5". The user watches the display screen and selects the object, in which the error occurred, using an input device such as a mouse. To retransmit to the user only the node selected by the user, the terminal forms an upstream channel message, for example, "retransmit NodeID 5", and transmits the message to the server. Even when an error occurred at an arbitrary node in a layer lower than the layer containing the node whose NodeID is "5", if a NodeID is not assigned to the arbitrary node of the lower layer, the terminal also transmits "retransmit NodeID 5".

Figure 6C:
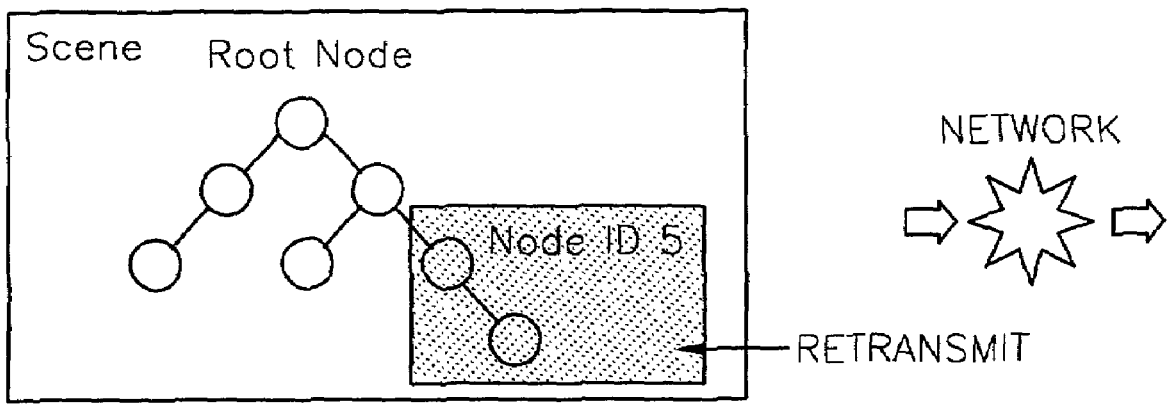

FIG. 6C illustrates an example of the server processing a scene when the terminal requests the server to retransmit a predetermined node. Using the NodeID of the corresponding object, the server finds out the corresponding node in the hierarchical structure of the MPEG-4 BIFS scene, and transmits the corresponding node, and if necessary, information on the corresponding node and all nodes of lower levels. For example, if an error occurred at a node whose NodeID is "5", the terminal needs only the corresponding node information, but if an error occurred at an arbitrary node of a level, lower than the node whose NodeID is "5", the terminal needs information on the corresponding node and all nodes of lower levels.

Figure 6D:
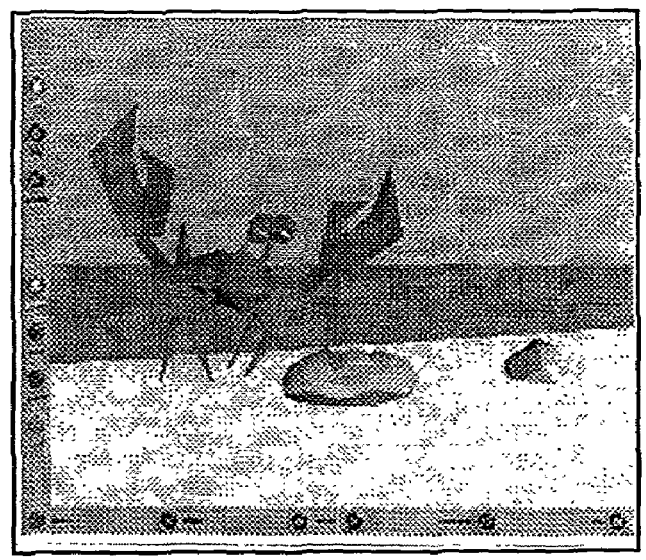

FIG. 6D shows the result of displaying a scene when the terminal received information on a node, in which an error occurred, from the server. The terminal displays the scene as shown in FIG. 6D, by substituting information on retransmitted node in the display screen shown in FIG. 6B.

According to the present invention, by properly handing events of user requests on partial elements in an arbitrary multimedia content provided for the user as interactive multimedia contents services, predetermined elements can be selectively processed. Therefore, information volume to be transmitted for restoration from an error can be minimized, and the terminal can quickly receive restored information. Particularly when an error occurred in an MPEG-4 BIFS scene, only predetermined nodes can be selectively processed in the MPEG-4 system, and therefore, information volume to be transmitted for restoration from the error can be reduced and the terminal can quickly receive restored information.

What is claimed is:

1. A user request processing method, using an upstream channel, after a three-dimensional scene generated based on a binary format is transmitted from a server to a terminal, the user request processing method comprising the steps of:
   (a) setting downstream/upstream channels between the server and the terminal as initialization;
   (b) the terminal forming an upstream channel message if a user request of predetermined processing of a predetermined object occurs in a scene transmitted from the server to the terminal through the downstream channel, and transmitting the message to the server through the upstream channel, wherein the upstream channel message identifies a corresponding node in the scene in which the user request occurred, wherein the user request is generated by the user selecting the predetermined object in the scene transmitted from the server to the terminal through the downstream channel, and wherein step (b) further comprises the steps of:
      (b1) defining the corresponding node in the scene, in which the user request occurred, using information on objects forming the transmitted scene;
      (b2) determining a node identifier of the defined node, using information on the objects;
      (b3) defining a command to be executed in the server for the defined node, in, response to the user request; and
      (b4) forming the upstream channel message containing the node identifier and the command;
   (c) the server receiving the upstream channel message, interpreting the message, processing the message as the user request of predetermined processing, and transmitting the result to the terminal; and
   (d) the terminal substituting the processing result of step (c) for the predetermined object in the scene transmitted in step (b), and providing it to the user.

2. The user request processing method of claim 1, wherein the information on the objects contains node identifiers based on sequence information or locations of nodes corresponding to the objects in the scene generated based on a binary format.

3. The user request processing method of claim 1, wherein step (b2) further comprises the steps of:
   (b2-1) determining whether or not the defined node is reusable in the scene, by the presence of a node identifier;
   (b2-2) if a node identifier assigned for reuse is in the defined node, using the node identifier; and
   (b2-3) if a node identifier assigned for reuse is not in the defined node, using a node identifier which has a node identifier and is immediately above the defined node.

4. The user request processing method of claim 3, wherein in step (b2-3), if the defined node and all other nodes in the scene are not reusable, the node identifier of the defined node is determined as a value which is for all nodes as subjects.

5. The user request processing method of claim 1, wherein step (c) further comprises the steps of:
   (c1) receiving the upstream channel message, interpreting the node identifier in the upstream channel message, end defining a subject node to be processed; and
   (c2) if a subject node to be processed is defined, confirming a node command in the upstream channel message, and processing the subject node according to the node command.

6. The user request processing method of claim 5, wherein in step (c1),
   the subject node is defined after confirming at least whether or pot the node identifier is for a node contained in the scene, and the structure type of the node indicated by the node identifier.

7. The user request processing method of claim 6, wherein in step (c1), a subject node is defined after confirming information on nodes directly dependent on the node indicated by the node identifier.

8. The user request processing method of claim 6, wherein in step (c1), if the node identifier is a value for all the nodes in the scene as subjects, all the nodes in the scene are defined as subject nodes.

9. The user request processing method of claim 1, wherein the scene is generated based on a moving picture expert group (MPEG)-4 binary format in an MPEG-4 system, the server has an MPEG-4 scene encoder, and the terminal has an MPEG-4 scene decoder.

10. A user request processing apparatus using an upstream channel in a system providing bidirectional communication services, the user request processing apparatus comprising:
 a server for transmitting through a downstream channel a three-dimensional scene generated based on a binary format, receiving and interpreting an upstream channel message; and processing the message as user's request of predetermined processing; and
 a terminal for forming an upstream channel message if a user request of predetermined processing for a predetermined object in the scene transmitted from the server occurs, and transmitting the message to the server through an upstream channel, wherein the upstream channel message identifies a corresponding node in the scene for which the user request occurred, wherein the user request is generated by the user selecting the predetermined object in the scene transmitted from the server, and wherein the terminal comprises;
  a node interpreter for defining the corresponding node in the scene, for which the user request occurred, using information on the objects forming the transmitted scene;
  a node identifier determiner for determining a node identifier of the defined node, using information on the objects;
  a command generator for defining a command to be processed in the server, in response to the user request for the defined node; and
  an upstream channel message transmitter forming the upstream channel message containing the node identifier and the command,
 wherein the server transmits the result of the processing to the terminal, and
wherein the terminal substitutes the processing result for the predetermined object in the scene and provides it to the user.

11. The user request processing apparatus of claim 10, wherein information on the objects includes node identifiers according to sequence information or locations of nodes corresponding to objects in the scene generated based on the binary format.

12. The user request processing apparatus of claim 10, wherein the node identifier determiner further comprises:
 a node identifier presence determiner for determining whether or not the defined node is reusable in the scene, by the presence of a node identifier, and if a node identifier assigned for reuse exists in the defined node, using the corresponding node identifier; and
 a node identifier generator for using the node identifier of a node, which is immediately above the defined node and has a node identifier, if a node identifier assigned for reuse does not exist in the defined node.

13. The user request processing apparatus of claim 12, wherein the node identifier generator sets the node identifier of the defined node to a value for all nodes as subjects, if the defined node and all other nodes in the scene are not reusable.

14. The user request processing apparatus of claim 10, wherein the server comprises;
 an upstream channel message receiver for receiving the upstream channel message;
 a node interpreter for interpreting the node identifier in the upstream channel message and defining subject nodes to be processed; and
 a command processor for confirming node commands in the upstream channel message, if the subject nodes are defined, and processing the subject nodes according to the node commands.

15. The user request processing apparatus of claim 14, wherein the node interpreter defines a subject node after confirming at least whether or not the node identifier is for a node contained in the scene, and the structure type of the node indicated by the node identifier.

16. The user request processing apparatus of claim 15, wherein the node interpreter defines a subject node after confirming information on nodes directly dependent on the node indicated by the node identifier.

17. The user request processing apparatus of claim 15, wherein the node interpreter defines all the nodes in the scene as subject nodes if the node. iidentifier is a value for all the nodes in the scene as subjects.

18. The user request processing apparatus of claim 10, wherein the scene is generated based on a moving picture expert group (MPEG)-4 binary format in an MPEG-4 system, the server has an MPEG-4 scene encoder, and the terminal has an MPEG-4 scene decoder.

19. A user request processing method using an upstream channel in interactive multimedia contents services, the user request processing method comprising the steps of:
 (a) setting downstream/upstream channels between the server and the terminal as initialization;
 (b) the terminal forming an upstream channel message if a user request of predetermined processing of a predetermined element occurs in a multimedia content transmitted from the server to the terminal through the downstream channel, and transmitting the message to the server through the upstream channel, wherein the upstream channel message identifies a corresponding node in a three-dimensional scene in which the user request occurred, wherein the user request is generated by the user selecting the predetermined element in the multimedia content comprising the three-dimensional scene transmitted from the server to the terminal through the downstream channel, and wherein step (b) further comprises the steps of:
  (b1) defining the corresponding node in the scene, in which the user request occurred, using information on objects forming the transmitted scene;
  (b2) determining a node identifier of the defined node, using information on the objects;
  (b3) defining a command to be executed in the server for the defined node, in response to the user request; and
  (b4) forming the upstream channel message containing the node identifier and the command;
 (c) the server receiving the upstream channel message, interpreting the message, processing the message as the user request of predetermined processing, and transmitting the result to the terminal; and
 (d) the terminal substituting the processing result of step (c) for the predetermined element in the multimedia content transmitted in step (b), and providing it to the user.

20. The user request processing method of claim 19, wherein the upstream channel message in step (b) is formed to have at least an inherent identifier, which can be confirmed in a server assigned for the predetermined element, and a command corresponding to the user request of predetermined processing.

* * * * *